July 21, 1953  J. UDELMAN  2,646,130
HELICOPTER
Filed Dec. 29, 1950  3 Sheets-Sheet 1
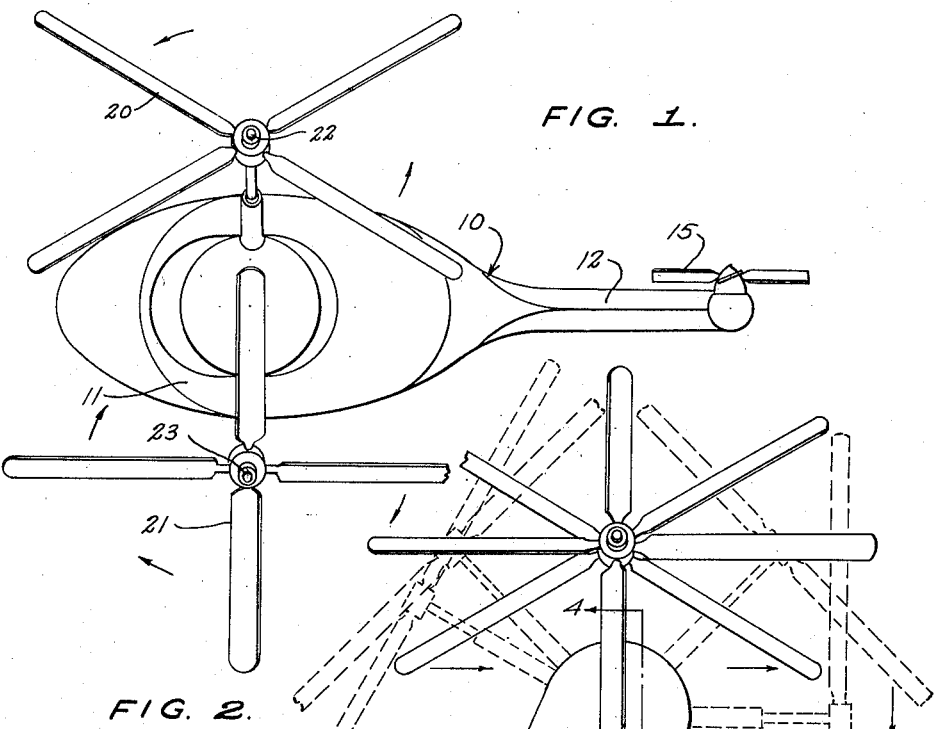
FIG. 1.
FIG. 2.
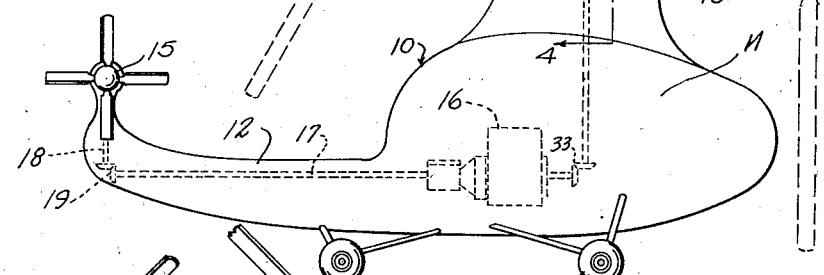
FIG. 3.
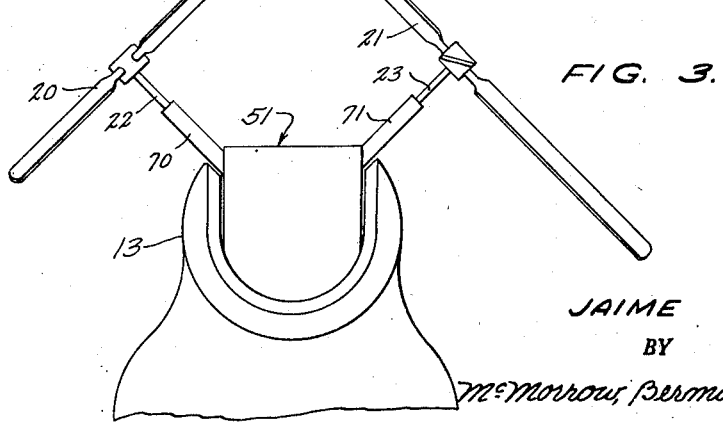
INVENTOR.
JAIME UDELMAN,
BY
McMorrow, Berman & Davidson
ATTORNEYS.

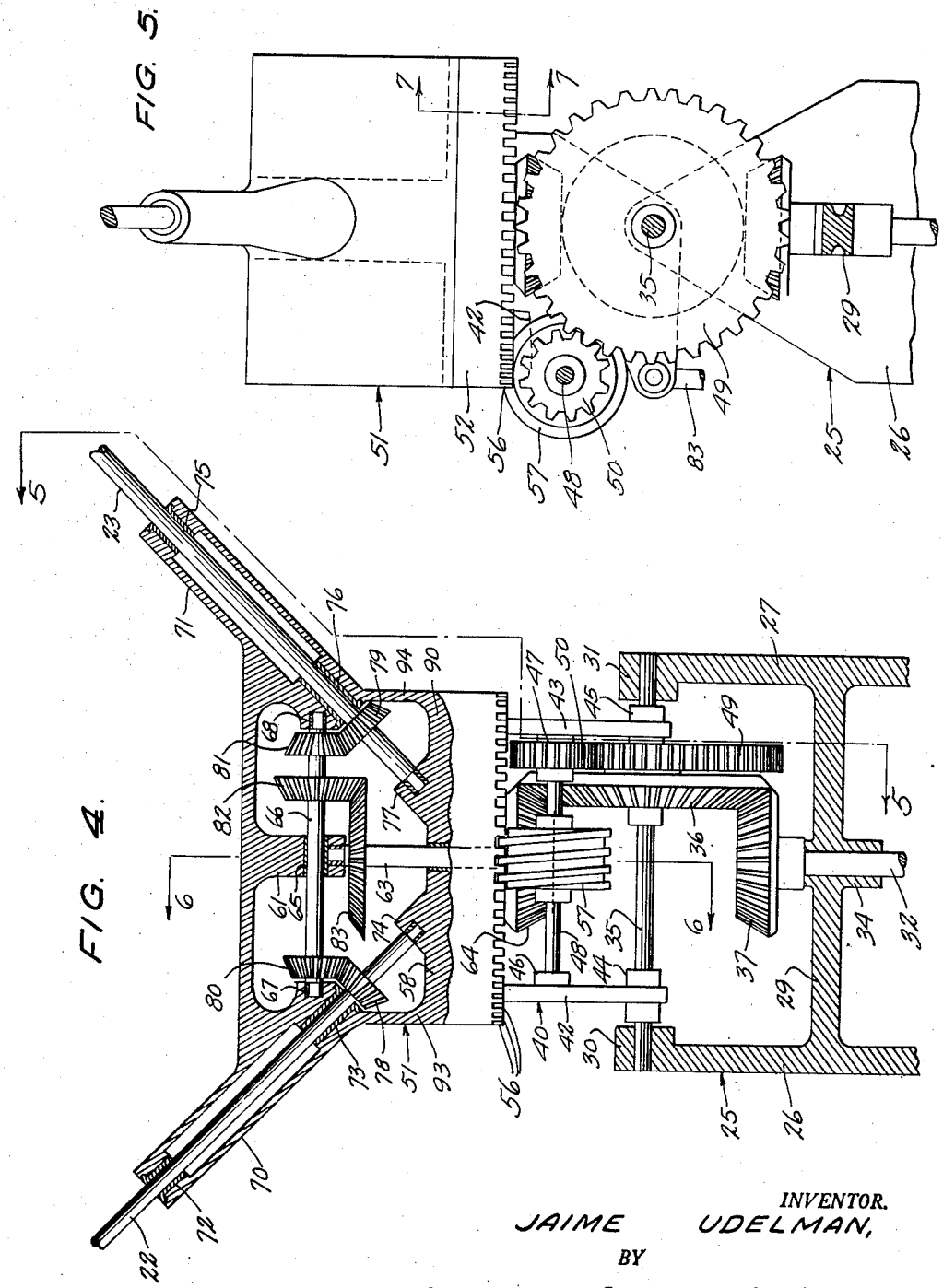

July 21, 1953   J. UDELMAN   2,646,130
HELICOPTER
Filed Dec. 29, 1950   3 Sheets-Sheet 3
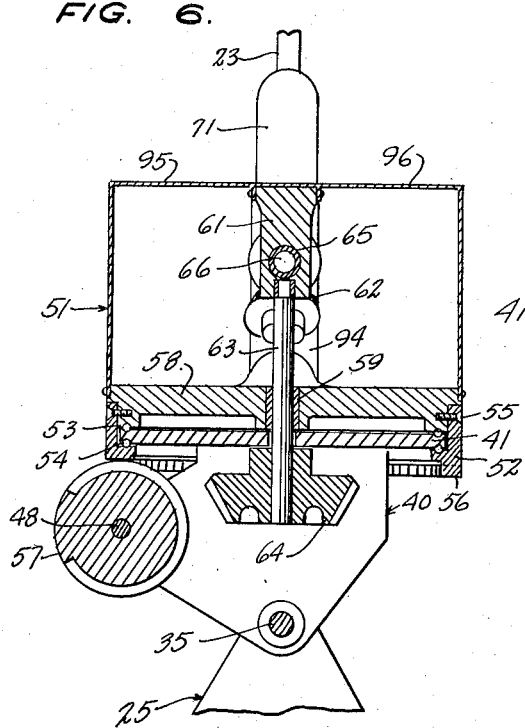
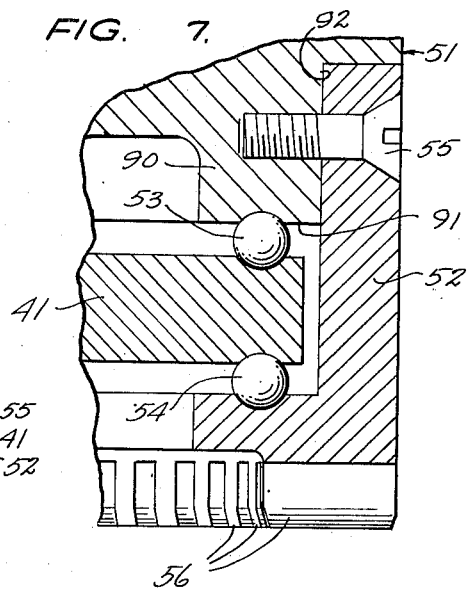
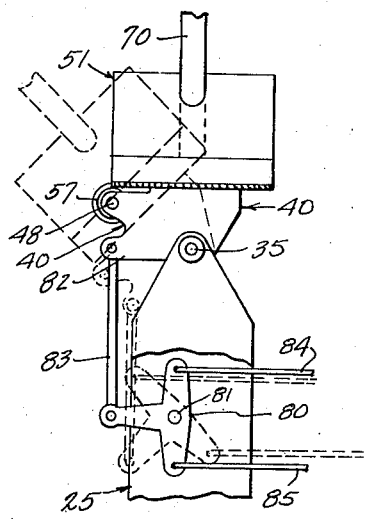
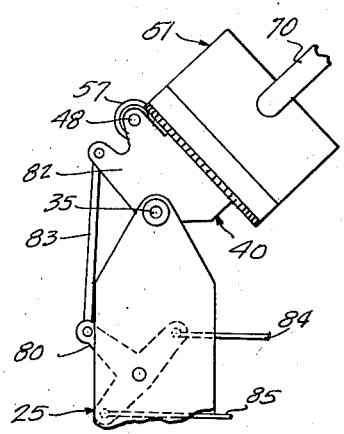
INVENTOR.
JAIME UDELMAN,
BY
McMorrow, Berman & Davidson
ATTORNEYS.

Patented July 21, 1953

2,646,130

UNITED STATES PATENT OFFICE 2,646,130

HELICOPTER

Jaime Udelman, Cartago, Costa Rica

Application December 29, 1950, Serial No. 203,265

4 Claims. (Cl. 170—135.22)

This invention relates to helicopters and more particularly to a multi-rotor helicopter having separate axes of rotor rotation.

It is among the objects of the invention to provide an improved helicopter having two or more main rotors rotatable about separate individual axes and revoluble about a common axis during rotation thereof so that the rotors will be constantly operating in substantially undisturbed air, greatly increasing the thrust and efficiency of the rotors; which provides means for continuously applying power to the rotors to rotate the latter while they are being revolved around a common axis; which provides means for tilting the axis about which the rotors are revolved forwardly and rearwardly to apply vertical and horizontal thrust factors in selected ratios to the helicopter for controlling the lift and translational forces applied thereto; which provides means for counteracting the torque applied to the rotors for revolving them about a common axis; which includes means for driving the main rotors and the torque counteracting means from a common power plant and for maintaining the application of power to the main rotors during tilting of the axis about which they revolve; which is especially constructed to avoid breakage of parts or malfunctioning of the mechanism in operation; and which is of simple, durable and light weight construction, economical to manufacture, and efficient and effective in operation.

Other objects and advantages will become apparent from a consideration of the following description and the appended claims in conjunction with the accompanying drawings wherein:

Figure 1 is a somewhat diagrammatic top plan view of a helicopter illustrative of the invention;

Figure 2 is a side elevational view of the helicopter illustrated in Figure 1;

Figure 3 is a fragmentary front elevational view on a somewhat enlarged scale of the upper portion of the helicopter illustrated in Figures 1 and 2;

Figure 4 is a cross sectional view on an enlarged scale of the rotor driving and tilting mechanism of the helicopter and is taken substantially on the line 4—4 of Figure 2;

Figure 5 is a cross sectional view on the line 5—5 of Figure 4;

Figure 6 is a cross sectional view on the line 6—6 of Figure 4;

Figure 7 is a fragmentary cross sectional view on an enlarged scale on the line 7—7 of Figure 5;

Figure 8 is a somewhat diagrammatic side elevational view on a reduced scale of the rotor driving and tilting mechanism shown in Figure 4, showing one operative position of the parts of the mechanism; and Figure 9 is a view similar to Figure 8, but showing the parts in a different operative position from that illustrated in Figure 8.

With continued reference to the drawings, the helicopter has a body or fuselage, generally indicated at 10, including a rounded or streamlined engine and passenger compartment 11, a tail 12 projecting rearwardly from the compartment 11, and a tower 13 extending upwardly from the top of the engine and passenger compartment. The fuselage carries at its under side suitable landing wheels or floats 14 and a torque counteracting rotor 15 is mounted on the rear end of the tail 12 for rotation about a substantially horizontal axis disposed at right angles to the longitudinal center line of the fuselage. An engine 16 is mounted in the engine and passenger compartment 11 and is connected to the torque counteracting rotor 15 through suitable means, such as the drive shafts 17 and 18 and the intermeshing beveled gears 19. Some suitable form of manual control, not illustrated, will be applied to the torque counteracting rotor to provide a manually operated steering control for the helicopter.

In the arrangement illustrated, two main rotors 20 and 21 are disposed above the tower 13 and connected to the helicopter by the corresponding rotor shafts 22 and 23 and are driven by the engine 16 and simultaneously revolved about a common axis by mechanism presently to be described.

The mechanism for supporting and rotating the rotors and revolving them about a common axis is illustrated in detail in Figures 4 to 7 inclusive. This mechanism includes a supporting frame, generally indicated at 25, the lower end of which is preferably secured to the engine 16 or to the engine mount adjacent one end of the engine and which extends upwardly in the compartment 11 substantially perpendicular to the longitudinal center line of the body 10.

The support frame 25 includes spaced apart and substantially parallel uprights 26 and 27 connected by transverse webs, one of which is indicated at 29, and provided in their upper ends with bearing formations 30 and 31 respectively, which bearing formations are mutually aligned transversely of the support frame.

A drive shaft 32 is disposed between the uprights 26 and 27 and extends substantially from one end to the other end of the support frame.

The engine 16 is drivingly connected to the lower end of this drive shaft by suitable means, such as the beveled gears 33 and the shaft extends through and is journaled in bearing formations, such as the bearing formations 34 carried by the upper transverse web 29.

A first transverse shaft 35 is journaled at its ends in the bearing formations 30 and 31 at the upper end of the support frame and a beveled gear 36 is mounted on this shaft intermediate the length thereof. A beveled gear 37 is mounted on the drive shaft 32 at the upper end of the latter and meshes with the beveled gear 36 to provide a driving connection between the drive shaft 32 and the first transverse shaft 35.

A carrier, generally indicated at 40, is tiltably mounted on the shaft 35 and includes a circular top plate 41 and two side plates 42 and 43 extending perpendicularly from the same side of the top plate 41 in spaced apart and substantially parallel relationship to each other. These side plates are symmetrically spaced from a common diameter of the circular top plate 41 and are of polygonal shape, each providing a portion tapering in width to the lower end thereof.

Apertured bearing formations 44 and 45 are carried by the side plates 42 and 43 respectively near the lower ends of the side plates, that is, the ends of the side plates remote from the top plate 41, and the transverse shaft 35 is received in these bearing formations 44 and 45 to tiltably mount the carrier on the support structure 25. The transverse shaft 35 is disposed substantially at right angles to the longitudinal center line of the helicopter fuselage so that the carrier 40 will have a fore and aft tilting movement relative to the support frame.

The side plate 42 is provided with an additional bearing formation 46 and the side plate 43 is provided with a corresponding additional bearing formation 47, the bearing formations 46 and 47 being mutually aligned transversely of the carrier, and a second transverse shaft 48 is journaled at its ends in the bearing formations 46 and 47.

A spur gear 49 is mounted on the first transverse shaft 35 adjacent the beveled gear 36 and a spur gear 50, smaller than the spur gear 49, is mounted on the transverse shaft 48 and meshes with the spur gear 49 to provide a speed reducing driving connection from the transverse shaft 35 to the transverse shaft 48.

A cylindrical head, generally indicated at 51, is mounted on the carrier 40 and has an open end provided with a marginal boss formation disposed adjacent the upper surface of the carrier top plate 41. A flanged ring 52 is secured to the head 51 and includes an annular internal rib marginally underlying the under surface of the carrier top plate 41, antifriction bearing elements 53 and 54 being disposed between the boss and the upper side of the top plate 41 and between the annular rib and the under side of the top plate respectively to provide an antifriction bearing between the head and the carrier top plate for free rotation of the head about the carrier. The upper portion of the ring 52 is received in an annular recess 92 provided in the head at the open end of the latter and the ring is secured to the head by suitable means, such as the screws 55. The end of the ring 52 remote from the head is provided with an annular series of gear teeth 56 and a worm 57 mounted on the second transverse shaft 48 meshes with these gear teeth to rotate the head 51 about the carrier 40 when the shaft 48 is driven from the drive shaft 32 through the gears 37, 36, 49 and 50.

The head 51 comprises a frame or skeletal formation of integral construction including a ring formation 90 constituting the bearing boss and having on one side a bearing surface 91 cooperating with the ball elements 53. The annular recess 92 receiving the toothed ring 52 is provided in the outer annular surface of the ring formation 90. The frame further includes a spoke formation 58 extending diametrically of the ring formation 90, legs 93 and 94 projecting upwardly from the ring formation one at each end of the spoke formation 58 in spaced apart and substantially parallel relationship to each other and a web formation 60 extending between the legs 93 and 94 at the ends of the latter remote from the spoke formation 58.

At its mid-length location the spoke is provided with a transversely extending bearing aperture 59 the axis of which is perpendicular to the plane of the bearing surface 91 and the web 61 is provided at its mid-length location with a bearing recess 62 opening to the side of the web formation adjacent the spoke formation 58 and having its axis in longitudinal alignment with the axis of bearing aperture 59.

Partly cylindrical curves 95 and 96 formed of light weight sheet metal are preferably mounted on the head at opposite sides of the web 61 and enclose the spaces between the ring formation 90 and the opposite sides of the web 61 and legs 93 and 94.

A stub shaft 63 extends through the aperture in the top wall 41 of the carrier, through the bearing 59 and into the bearing recess 62, being journaled in the bearing 59 and bearing recess 62. A beveled gear 64 is secured on the lower end of this stub shaft and meshes with the gear 66 on the first transverse shaft 35 so that the stub shaft 63 is driven from the drive shaft 32. The web 61 is provided at its mid-length location with a transverse aperture having its axis perpendicular to the axis of recess 62 and extends through and is journaled in the bearing 65 and is journaled at its ends in bearing recesses provided in bearing bosses 67 and 68 projecting inwardly from the legs 93 and 94 respectively adjacent the web 61.

Bearing tubes 70 and 71 extend outwardly and upwardly from the web 61 near respectively opposite ends of the latter, the angular interval between the center lines of the two bearing tubes being approximately 90 degrees, and the angular interval between each bearing tube and the perpendicular axis of the head 51 about which the head rotates, being approximately 45 degrees.

The bearing tube 70 carries an outer bearing 72 and an inner bearing 73 and the rotor shaft 22 extends through the tube 70 into the head 51 and is journaled in the bearings 72 and 73. At its inner end the rotor shaft 22 is journaled in a bearing recess provided in a boss 74 provided on the side of the spoke formation 58 adjacent the web 61. The bearing tube 71 is provided with an outer bearing 75 and an inner bearing 76 and the rotor shaft 23 extends through the tube and is journaled in these bearings 75 and 76. At its inner end the shaft 23 is journaled in a bearing recess provided in a boss 77 extending from the side of the spoke formation 58 adjacent the web 61 of the head and at the side of the shaft 63 remote from the boss 74.

A beveled gear 78 is mounted on the rotor shaft 22 at the inner end of the inner bearing 73 and a similar beveled gear 79 is mounted on the rotor shaft 23 at the inner end of the inner bearing 76.

A beveled gear 80 is mounted on the transverse shaft 66 and meshes with the gear 78 while a similar beveled gear 81 is also mounted on the transverse shaft 66 and meshes with the beveled gear 79. A beveled gear 82 is mounted on the shaft 66 between the gears 80 and 81 and meshes with a beveled gear 83 secured on the stub shaft 63 near the upper end of the latter.

The gears 83, 82, 80, 81, 78 and 79 provide a driving connection between the stub shaft 63 and the two rotor shafts 22 and 23 and the gears 37, 36 and 64 provide a driving connection between the drive shaft 32 and the stub shaft 63, as explained above, so that the rotor shafts are rotationally driven by the drive shaft at the same time that the head 51 is rotated around the carrier 40.

With this arrangement, the two rotors 20 and 21 will be rotated about their individual axes in respectively opposite directions and will be continuously revolved about the axis of rotation of the head 51. The rotors will thus be continuously moved into relatively undisturbed air as they are rotationally driven. As the resistance of the relatively undisturbed air is much greater than that of the air passing through the rotor disc, this revolving movement of the rotors greatly increases the thrust developed by the rotors and also materially increases the rotor efficiency. This is extremely important at the beginning of a vertical lift of the helicopter since, at this time, the rotors are operating substantially under a static thrust condition which is the most inefficient operating condition encountered in the operation of helicopters. After the rotors start to move through the air their efficiency increases, the increase in efficiency being variably proportional to the speed of movement of the rotors through the air.

While two oppositely disposed rotors have been illustrated and described above, it is to be understood that three or more rotors may be utilized without in any way exceeding the scope of the invention.

The tilting of the head, rotor shafts, rotors and carrier relative to the support frame 25 is manually controlled and to this end suitable manually operated mechanism is provided. Such mechanism may comprise a double bell crank 80 pivotally mounted at the juncture of its legs on the support frame 25 by a pivot pin 81. One leg of the bell crank 80 is connected at its distal end to the distal end of a lug formation 82 on one of the side plates of the carrier by a link 83 and substantially parallel links 84 and 85 connect the distal ends of the other two legs of the bell crank to a manually operated device, such as a wheel or lever, not illustrated.

The arrangement of the manually operated mechanism is preferably such that the head can be tilted through an angle of approximately 45 degrees forwardly from the longitudinal center line of the support frame 25 and can be tilted to an angle of approximately 45 degrees rearwardly from this longitudinal center line, the neutral and rearward positions being shown in full and broken lines respectively in Figure 8, and the limiting forward position being illustrated in full lines in Figure 9.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a helicopter, a rigid support having a top end, a power shaft extending upwardly through and journaled in said support, a first transverse shaft journaled at its ends in said support and disposed substantially perpendicular to said power shaft, a beveled gear on said transverse shaft, a beveled gear on said power shaft meshing with the beveled gear on said transverse shaft, said beveled gears providing a driving connection between said drive shaft and said transverse shaft, a carrier tiltably mounted on said support and comprising a circular top plate and side plates extending perpendicularly from said top plate in spaced apart and substantially parallel relationship to each other, said side plates having bearings therein with each bearing in one side plate aligned with a corresponding bearing in the other side plate and said first transverse shaft extending through aligned bearings in said side plates to tiltably connect said carrier to said support, a second transverse shaft journaled at its ends in aligned bearings in said side plates and disposed in substantially parallel relationship to said first transverse shaft, gear means providing a speed reducing drive connection between said first and said second transverse shafts, a cylindrical head having an open end receiving the top plate of said carrier and a web extending diametrically across its other end, means providing an anti-friction bearing between the top plate of said carrier and said head for free rotation of said head about said carrier, bearing tubes projecting from said web and inclined symmetrically upwardly and outwardly from the axis of rotation of said head about said carrier, rotor shafts journaled one in each bearing tube and extending into said head, a stub shaft extending through the top plate of said carrier into said head and journaled in the latter, a beveled gear on one end of said stub shaft meshing with said beveled gear on said first transverse shaft to provide a driving connection between said drive shaft and said stub shaft, gear means disposed within said head and providing a driving connection between said stub shaft and both of said rotor shafts, an annular series of gear teeth on said head at the open end of the head, a worm on said second transverse shaft meshing with the gear teeth on said head for rotating said head about said carrier and revolving said rotor shafts about the axis of rotation of said head, and manually operated means connected to said carrier for controlling tilting movements of said carrier, said head and said rotor shafts about said first transverse shaft.

2. In a helicopter including a body and sustaining rotors disposed above and connected to said body in spaced apart relationship to each other, means for driving said rotors about individual axes, simultaneously revolving them about a common axis, and tilting them about an axis substantially perpendicular to said common axis comprising a support fixed in said body, a carrier pivotally connected to the upper end of said support for tilting movements relative to the latter, a head journaled at one end on said carrier for rotation therearound and having bearing tubes inclined upwardly and outwardly from the other end thereof, the axis of rotation of said head about said carrier being substantially perpendicular to the axis of tilting movements of said carrier relative to said support, rotor shafts journaled one in each bearing tube and each connected at its outer end to a correspondent rotor, a drive shaft journaled on said support, means drivingly connecting said drive shaft to said rotor shafts for driving said rotor shafts about their individual axes, means drivingly connecting said drive shaft to said head for rotating said head about said carrier and revolving said rotors and rotor shafts about the axis of rotation of said head, and manually operated means connected to said carrier for controlling tilting movements of said carrier, said head, said rotor shafts and said rotors relative to said support.

3. In a helicopter including a body and sustaining rotors disposed above and connected to said body in spaced apart relationship to each other, means for driving said rotors about individual axes, simultaneously revolving them about a common axis, and tilting them about an axis substantially perpendicular to said common axis comprising a support fixed in said body, a carrier pivotally connected to the upper end of said support for tilting movements relative to the latter, a head journaled at one end on said carrier for rotation therearound and having bearing tubes inclined upwardly and outwardly from the other end thereof, the axis of rotation of said head about said carrier being substantially perpendicular to the axis of tilting movements of said carrier relative to said support, rotor shafts journaled one in each bearing tube and each connected at its outer end to a corresponding rotor, a drive shaft journaled on said support, means drivingly connecting said drive shaft to said rotor shafts for driving said rotor shafts about their individual axes, means drivingly connecting said drive shaft to said head for rotating said head about said carrier and revolving said rotors and rotor shafts about the axis of rotation of said head, and manually operated means connected to said carrier for controlling tilting movements of said carrier, said head, said rotor shafts and said rotors relative to said support, said means drivingly connecting said drive shaft to said rotor shafts having a higher speed ratio than said means drivingly connecting said drive shaft to said head.

4. In a helicopter including a body and sustaining rotors disposed above and connected to said body in spaced apart relationship to each other, a support fixed in said body, a carrier pivotally connected to the upper end of said support for tilting movements relative to the latter, a head journaled at one end on said carrier for rotation therearound and having bearing tubes inclined upwardly and outwardly from the other end thereof, the axis of rotation of said head about said carrier being substantially perpendicular to the axis of tilting movements of said carrier relative to said support, rotor shafts journaled one in each bearing tube and each connected at its outer end to a corresponding rotor, a drive shaft journaled on said support, means drivingly connecting said drive shaft to said rotor shafts for driving said rotor shafts about their individual axes, means drivingly connecting said drive shaft to said head for rotating said head about said carrier and revolving said rotors and rotor shafts about the axis of rotation of said head, and manually operated means connected to said carrier for controlling tilting movements of said carrier, said head, said rotor shafts and said rotors relative to said support about said axis of the pivotal connection between said head and said support.

JAIME UDELMAN.

References Cited in the file of this patent

UNITED STATES PATENTS

| Number | Name | Date |
|---|---|---|
| 1,001,849 | Hopkins | Aug. 29, 1911 |
| 1,508,016 | Ellis | Sept. 9, 1914 |
| 2,427,981 | Thompson | Sept. 23, 1947 |
| 2,452,726 | Buchet | Nov. 2, 1948 |

FOREIGN PATENTS

| Number | Country | Date |
|---|---|---|
| 37,419 | Switzerland | May 15, 1906 |
| 853,421 | France | Dec. 7, 1939 |